United States Patent [19]

Zaninelli

[11] 4,317,396

[45] Mar. 2, 1982

[54] REVOLVING TOOL CARRYING TURRET FOR LATHES

[75] Inventor: Ettore Zaninelli, San Donato Milanese, Italy

[73] Assignee: Baruffaldi Frizioni S.p.A., San Donato Milanese, Italy

[21] Appl. No.: 168,464

[22] Filed: Jul. 10, 1980

[30] Foreign Application Priority Data

Jul. 17, 1979 [IT] Italy ............................. 24419 A/79

[51] Int. Cl.³ ............................................ B23B 29/00
[52] U.S. Cl. .................................................. 82/36 A
[58] Field of Search ............................. 82/36 R, 36 A

[56] References Cited

U.S. PATENT DOCUMENTS 3,760,655  9/1973  Buchmeir ........................... 82/36 A
3,905,257  9/1975  Thumm et al. ..................... 82/36 A

FOREIGN PATENT DOCUMENTS 1293526  4/1969  Fed. Rep. of Germany ..... 82/36 A
1301688  8/1969  Fed. Rep. of Germany ..... 82/36 A Primary Examiner—Harrison L. Hinson
Attorney, Agent, or Firm—Karl F. Ross

[57] ABSTRACT

A revolving tool carrying turret for lathes and the like machine tools, comprises a fixed base and a movable tool carrying body, effective to be locked to one another by base ring gears, the fixed base being provided with a central upright thereon is coaxially formed a screw rigid therewith, engaging a nut screw effective to revolve and axially move through a predetermined angle, corresponding to the movement required for unlocking or locking the base ring gears. The central upright supports, at the top end thereof, an electric motor therewith is coupled an epicyclical unit having a first end gear wheel rigid with the tool carrying body and a second end gear wheel rigid with the nut screw, between the two end gear wheels being located one or more planet wheels.

6 Claims, 5 Drawing Figures

REVOLVING TOOL CARRYING TURRET FOR LATHES

BACKGROUND OF THE INVENTION

The present invention relates to a revolving tool carrying turret, provided with means for carrying out the unlocking and locking axial movements of the tool carrying body and for rotating said tool carrying body from a working position to the next working position.

Different revolving turrets are already known which at the periphery thereof bear, on a prismatic body or a disc, a plurality of working tools provided for carrying out predeterminent working operations in subsequent times.

Generally, the movements carried out periodically by said turrets are the following:

a revolving movement, with axial shifting, of a portion of the turret in order to unlock the tool carrying body from a fixed base of said turret;

a revolving movement of the tool carrying body in order to bring said tool carrying body from a position to the next one;

a positioning movement for positioning said tool carrying body, and a reversing of the revolving movement in order to lock said tool carrying body on the fixed base, in its new working position.

As it is known these movements are achieved by using an electric motor, as driven by rotating-brush switches, or the like, driving, in turn, a screw coaxial with respect to the turret, which screw is able of revolving without axially moving.

The tool bearing body is connected to a nut screw, coupled to said screw and being provided, coaxially, with a ring gear coupled to an opposite ring gear, this latter being rigid with the base of the turret.

The rotation of said screw firstly causes said nut screw, being rigid with said tool carrying body, to axially move in such a way as to bring to contact the two opposite ring gears. Upon disengaging said ring gears, the tool bearing or carrying body is able of rotating and hence it can assume new angular positions, to bring the following tools to working positions.

For carrying out this rotation or revolving movement, upon having disengaged or unlocked said ring gears, in the known types of turrets different means and devices are provided acting to render mutually rigid one another said screw and nut screw in such a way that this latter, being rigid with the tool carrying body, is able of rotating through a predetermined angle as far as to reach its new working position. These known devices are, generally, of complex structure, rather larger size and frequently unable of permitting motors of suitable horse power to be installed.

Two turrets of the same applicant are also known, therein there is provided a fixed base and a revolving screw, being prevented from axially moving, engaging a nut screw rigid with the tool carrying body, the driving motor being coupled to an epicyclical reduction unit effective to provide, at first, the movement to the screw, to rise the turret, and then the revolving of the tool carrying body as far as to reach the new working position and, finally, the lowering movement of the turret.

These known turrets of the same applicant, while satisfactory from a mere operative point of view, are, however, of rather complex structure, mainly with respect to the stopping thereof, which requires a large space and rather intricate and easily wearable locking devices.

SUMMARY OF THE INVENTION

The present invention sets out to provide such a turret effective to better exploit the inner available space and to have, the size being the same, better performances and a longer working life.

This aim is achieved by a revolving tool carrying turret for lathes and the like machine tools, comprising a fixed base and a movable tool carrying body, effective to be locked to one another by base ring gears and the like, characterized in that said fixed base is provided with a central upright or column, thereon is coaxially formed a screw rigid with said upright, engaging a nut screw effective to revolve and axially move only through a predetermined angle, or axial shifting, corresponding to the movement required for unlocking or locking said base ring gears, said nut screw being axially associated with said tool carrying body, said nut screw and said tool carrying body being able of revolving with respect to one another, said central upright supporting, at the top end thereof, an electric motor therewith is coupled an epicyclical unit having a first gear wheel rigid with said tool carrying body and a second end gear wheel rigid with said nut screw, between said two end gear wheels one or more planet wheels being located, said planet wheels pertaining to said epicyclical unit, between said fixed upright and said movable tool carrying body locating and locking means being provided formed by a sliding bolt effective to transversely slide within said fixed upright and perpendicularly to the axis thereof, and by locating hollows or slots as formed in said tool carrying body, or rigid therewith, said bolt being biassed by a spring to penetrate for locating one end of said tool carrying body within one said hollow or slot, the other end of said tool carrying body being prevented from moving by an abutment surface rigid with said nut screw, said bolt being effective to exit said one locating hollow or slot by rotating said tool carrying body through the contact of inclined planes of the two portions simultaneously to the aligning with said other end of said bolt of a radial hollow of like size as formed in said abutment surface of said nut screw in order to permit said tool carrying body to move from a position to a next one, said revolving or rotating movements of said nut screw and said tool bearing or carrying body being carried out by said planet wheels of said epicyclical unit, when either one or the other of said end wheels locates at a stop position.

In the turret according to the present invention, said epicyclical unit allows for either one or the other of said end wheels (respectively rigid with the tool carrying body and with said nut screw) to be rotated, depending on the stopped end wheel, the rotation or revolving movement of said end wheels being carried out in opposite directions.

Accordingly, it is possible to hold stationary the end wheel rigid with said tool carrying body and to rotate in a given direction the nut screw, thereby allowing for said nut screw to axially move and said tool carrying body to be unlocked from or locked to said base through said base ring gears, or, vice versa, to hold stationary the end wheel rigid with said nut screw and to rotate, in the opposite direction, said tool carrying body in order to pass from a working position to the next one.

Owing to the fact that the tool carryig body revolving direction, for changing its working position, is standaridized as the anticlockwise direction, as the turret is see from the top, this direction is considered to be the normal feeding or advancing direction. However, it should be clear that this direction can be reversed without the need of carrying out any changes: in particular, in the case of an anticlockwise advancing movement, the thread of the screw and nut screw of the turret according to the present invention should be of the left-handed type.

Accordingly, considering the turret locked in its operative position, the tool carrying body is initially stationary in its position, as locked or held by the end of the bolt engaged with the related hollow or slot: under this condition, if the electric motor is actuated, thereby rotating the planet wheel carrying train, since the end wheel rigid with the tool carrying body is locked, the other end wheel will revolve or rotate with said nut screw.

This revolving movement will be limited to the axial shifting required for unlocking the ring gears from one another and, to this end, the angular extension a of the radial window of the nut screw neck, wherethrough said bolt passes, should be such as to permit this axial movement, depending on said nut screw pitch and the height of the teeth of the locking ring gears.

Upon having carried out this axial movement, the nut screw stops against an axial shoulder or abutment or against an angular stop member thereby the other end wheel, that is the wheel rigid with the tool carrying body is caused to rotate.

Simultaneously, also said radial window of said nut screw neck will align with the opposite end of the bolt, thereby allowing for said bolt to exit the locating hollow or slot, as biassed by opposite inclined planes of said bolt and hollow or slot. Then the tool carrying body can revolve as far as to reach its new working position at which the bolt penetrates the next hollow. At this point the rotating direction of the motor is reversed thereby also the consequent movements are reversed. In fact the tool carrying body is locked again and thus the related end wheel, and accordingly the nut screw, rotates in an opposite direction through the angle a as allowed for by the radial hollow, thereby causing said tool carrying body to lower as far as to lock the related ring gears. Furthermore the cylindrical inner surface of the nut screw abuts the bolt end in such a way as to prevent said bolt from exiting the locating hollow.

The electric motor is of the hollow-rotor type and it is provided with an electromagnetic brake operating as the movements end. As a variation of the invention, it is provided for locating two opposite bolts, pushed away from one another by a spring and acting in the thereinabove indicated manner.

BRIEF DESCRIPTION OF THE DRAWING

These and other characteristics will become more apparent from the following detailed description, given by way of an example, of a tool carrying turret, being illustrated in the accompanying drawings, where.

DESCRIPTION OF THE PREFERRED EMBODIMENTS

Figure 1:
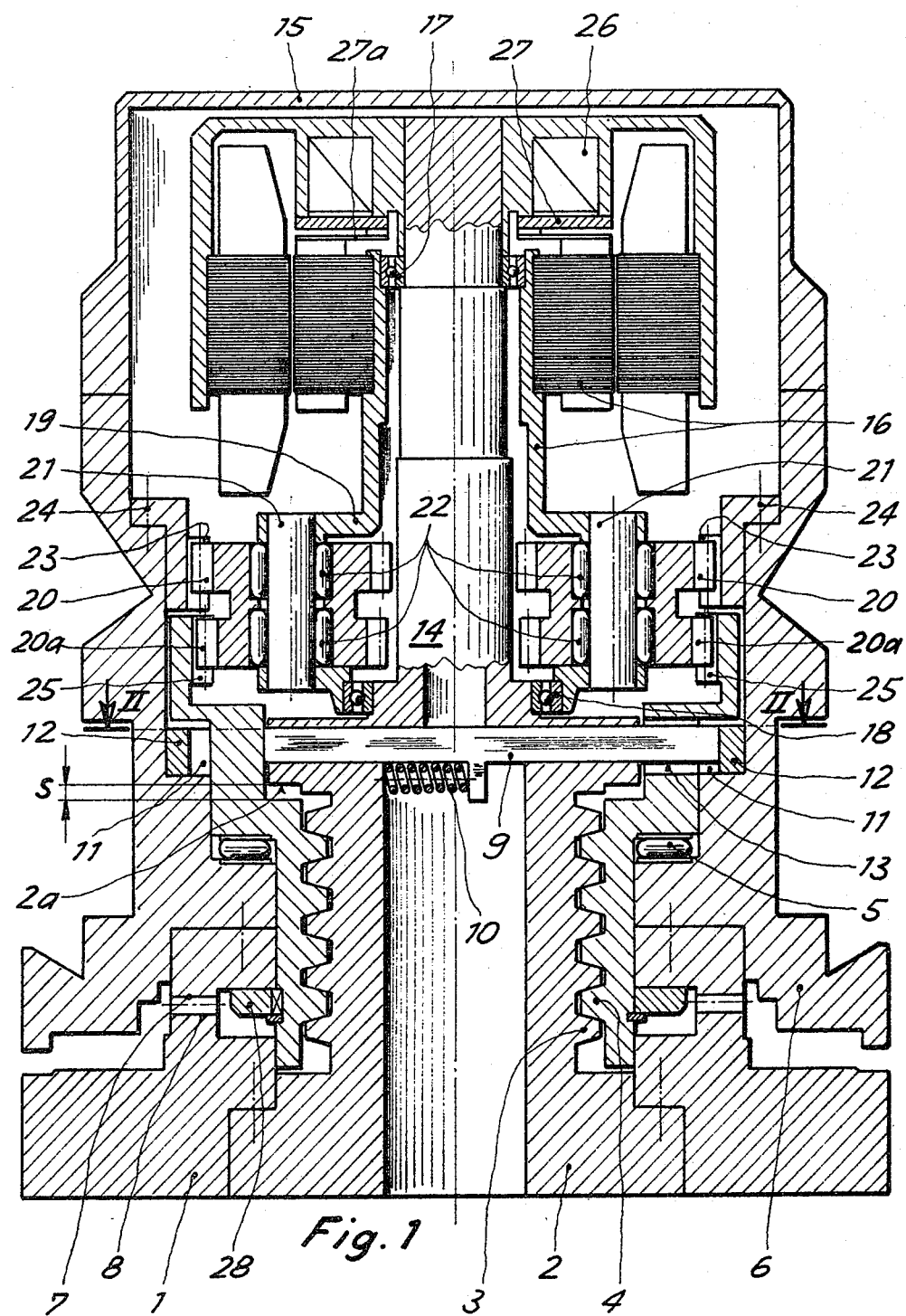
FIG. 1 is a vertical axial section view of the turret, according to an embodiment thereof, as taken along the line I—I of FIG. 2.
Figure 2:
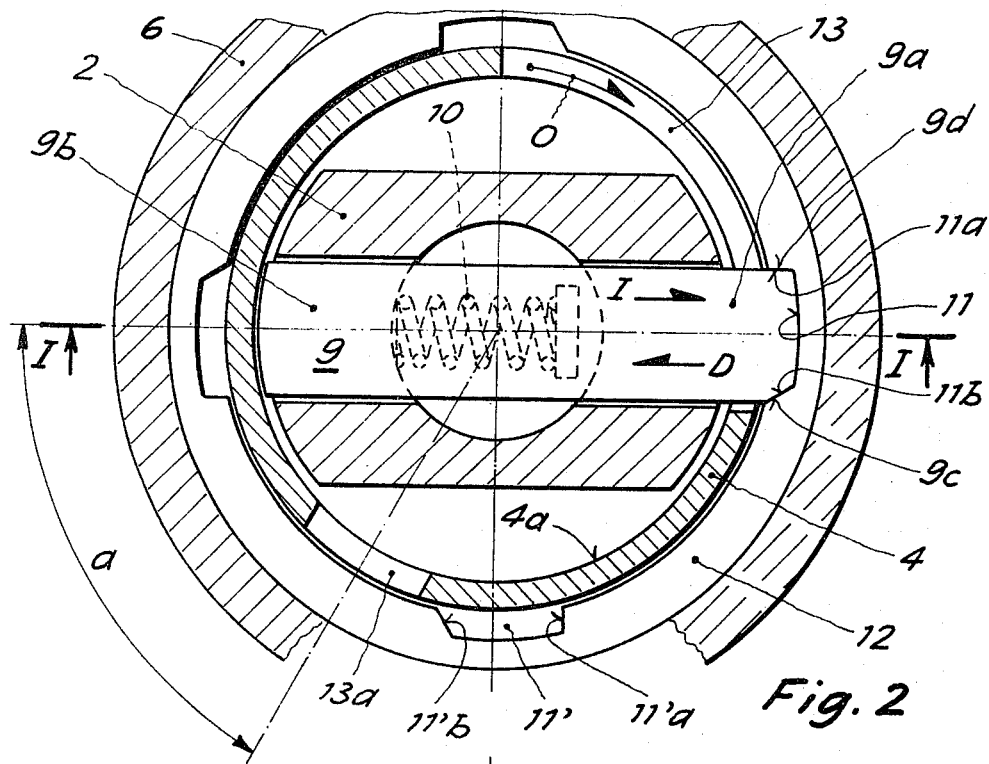
FIG. 2 is a cross section as taken along the line II—II of FIG. 1.

Referring to FIGS. 1-2, the turret according to the invention comprises a base 1, rigid with the machine tool, or the tool carrying carriage, or the like, and a central upright or column 2, rigid with said base 1, and provided with a coaxial screw 3; in driving relationship with respect to said screw 3, there is provided a nut screw 4, associated, by means of a thrust bearing 5, to a tool bearing or carrying body 6, being provided with peripherical guides, of known type, for housing the tools.

The nut screw 4 and the tool carrying body 6 can be moved axially for a predemined stroke "s", and said tool carrying body is rigid with a ring gear 7 meshing with a like ring gear 8 rigid with the base 1, for locking said tool carrying body 6 and base 1, the unlocking being carried out by rising the ring gear 7 rigid with said tool carrying body for a distance equal to said stroke "s".

A locking bolt 9, provided with a return spring 10 is located transversely with respect to the fixed upright 2, therethrough said bolt radially passes, and by-its end the bolt rotatively constrains said tool carrying body 6 by engaging the hollows 11 as formed separately (due to constructional reasons) in a locating ring 12 made rigid with said tool carrying body 6.

Said locking bolt has such a length as to be able of entering, with its free end 9a, the hollow 11 of the tool carrying body (or of the related ring 12, rigid therewith), while the opposite end 9b of said bolt contacts with its circular surface the inner surface 4a of the neck of the nut screw 4, as it is shown in FIG. 2. The end 9a of the bolt passes through said neck of the nut screw 4, through a window 13 having a size greater than the width of the bolt 9, the opposite end 9b being able of passing through said neck, through a window or slot 13a having a transversal size equal to the width of said bolt 9. The two windows are located at different angular positions with respect to the bolt 9, in which a way as to allow for the nut screw 4 and hence the window 13a, to move through an angle a, prior to the window aligns with said bolt 9.

Said central upright 2 is rigid with a coaxial shaft 14, which, in turn, rigidly supports the stator 15 of an electric motor the hollow rotor 16 whereof is rigid with a planet wheel carrying member 19, the assembly being able of rotating on the shaft 14 through the bearings 17-18. On said planet wheel carrying member 19 there are mounted the planet wheels 20-20a, effective to rotate on the pins 21 through the rollers or needles 22, the top planet wheels 20 having, in this case, a diameter less than the diameter of the bottom planet wheels 20a. The pairs of planet wheels 20-20a may be provided in any numbers, usually from 1 to 4, as distributed all along said planet wheel carrying member. The assembly forms an epicyclical reducing unit coupled with the end wheel meshing with the upper planet wheels 20 and rigid with said tool carrying body 6, through screws, pins or the like 24, and with the end wheel 25 rigid with the nut screw 4.

The rotor 16 is provided with an electromagnetic brake formed by a fixed coil 26 and by the movable armature 27, as supported by resilient blades 27a to the body of the rotor 16.

A ring 28, provided with a resilient detent, holds axially the nut screw 4 against the tool carrying body 6, thereby said nut screw 4 is able of freely rotating with respect to the body 6, being however bound, with respect to the axial movement, to said body, through the rollers 5 and the ring 28.

Said locating hollows 11, as formed on said body 6, or on an inserted ring 12, have the side whereof in the movement direction 11a extending substantially radially and the opposite side 11b whereof rearwardly slanted. The end 9a of the bolt is of like shape, having a slanted side 9c and a rectilinear side 9d, while the opposite end 9b of said bolt 9 has the both sides thereof parallely extending, as well as the window 13a, as formed through the neck of the nut screw 4.

Figure 3:
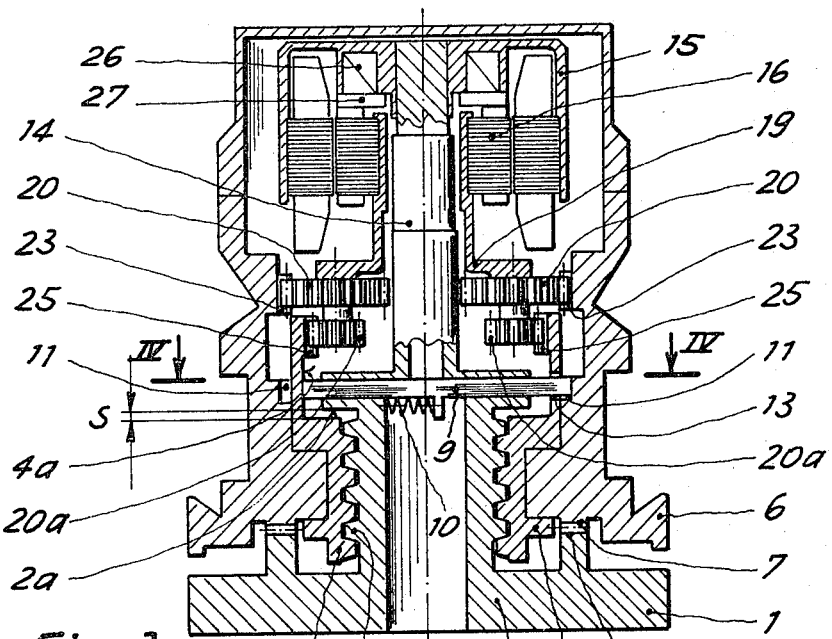
FIG. 3 is a simplified schematic view illustrating the turret shown in FIG. 1.
Figure 4:
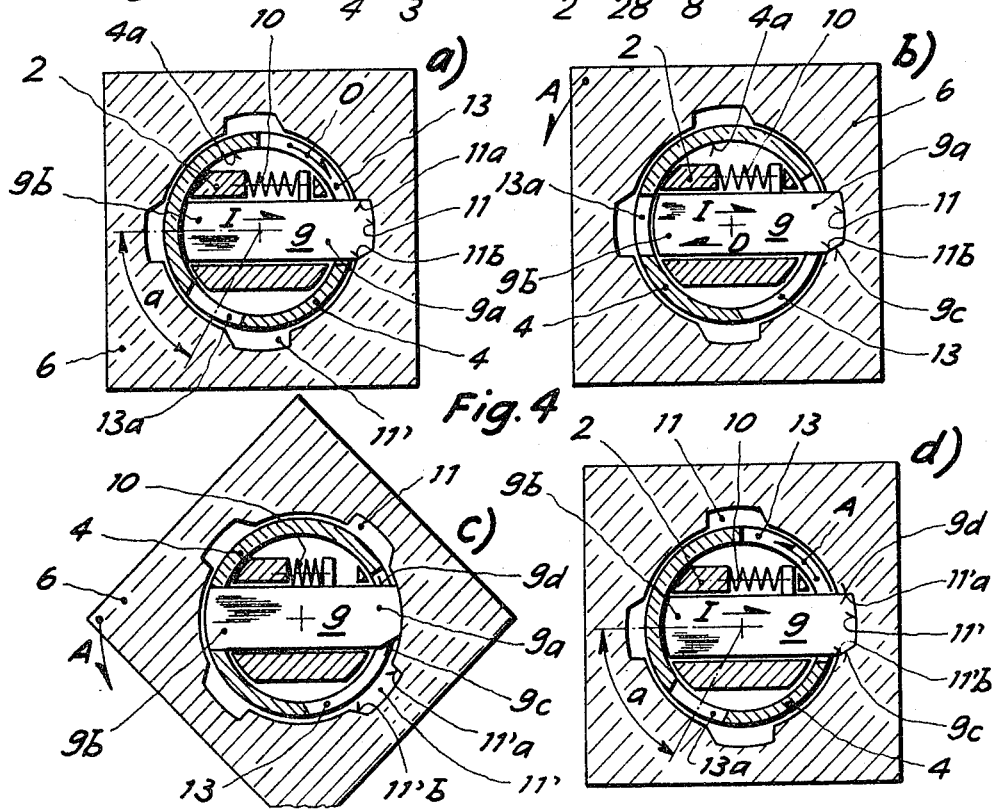
FIGS. 4(a-d) are cross-section views analogous to FIG. 2, schematically illustrating the positions assumed by the different parts during a movement cycle.

Referring to FIGS. 3 and 4, being represented in schematic form for clarity, it will be described the operation of the turret according to the invention: in this connection it should be noted that like elements as in FIGS. 1 and 2 have been indicated by like reference numbers in FIGS. 3 and 4.

Suppose that, as it is conventional, the tool carrying body 6, in order to reach the next working position (as seen from the top) has to rotate in the anticlockwise direction, and that the turret, in FIGS. 1 and 4a be in its locked position. Accordingly the screw 3, in order the nut screw 4 be able of rising by rotating in the clockwise direction, should be of the left handed type.

At the start of the position changing cycle of the tool carrying body 6, the electromagnetic brake 26-27 is disengaged and the rotor 16 with related planet wheel carrying member 19 and planet wheels 20-20a are rotated in the anticlockwise direction. Due to the fact that the tool carrying body 6 is locked by the base ring gears 7-8, the end wheel is stationary and hence the planet wheel 20a causes the end wheel 25 and hence the nut screw 4 to rotate in the clockwise direction.

The situation at the start of the movement is also shown in FIG. 4a, where it is possible to note the arrow O of clockwise rotation of the nut screw 4, the arrow I according to which the bolt clutch is pushed as biassed by the spring 10 and the inner surface 4a of the nut screw 4 preventing the bolt from moving in a direction opposite to the clutching direction.

The rotation of the nut screw 4 in the direction O is permitted since the window 13 is angularly extended for such an amount effective to allow for a rotation through at least an angle a, said angular rotation corresponding to the rising s as permitted by the nut screw 4 as far as to reach a stop against the related shoulder 2a.

FIG. 4b illustrates the situation at the end of the rotation a of the nut screw 4. The end 9a of the bolt is, also in this case, biassed by the spring 10 into the hollow or slot 11 of the tool carrying body 6 while the end 9b is now facing the window 13b of the nut screw 4.

Due to said clockwise rotation a, the nut screw 4 will be rised for the permitted distance s, in such a way as to disengage the ring gear 7 from meshing with the fixed gear 8. The tool carrying body 6, under this condition, is free of rotating, while the nut screw 4 is stopped by the shoulder 2a, as thereinabove stated, and, accordingly, the wheel 23 is rotated in a direction opposite to the revolving direction of the nut screw 4, that is in the clockwise direction, rigidly with the tool carrying body 6. This rotation biasses the bolt 9 to move in the disengaging direction D, due to the action of the opposite inclined planes 11b-9c, while the end 9b enters the window 13a. Thus the tool carrying body 6 is made free, which is able of rotating in the anticlockwise rotation A, the movement position of this latter being represented in FIG. 4c.

This revolving or rotating movement is continued as far as the next locating hollow or slot 11' locates in front of the end 9a of the bolt 9, thereby said bolt is able of entering said hollow as pushed by the spring 10, thereby causing the tool carrying body to assume a new working position.

At this point, and by known means, the rotation direction of the electric motor 6 is reversed, thereby the tool carrying body, being biassed in the clockwise direction is brought to a stop by the radial side 11'a-9d of the hollow 11', in such a way as to remain locked with the end wheel 23, while the nut screw 4 is free of rotating in the opposite direction with the end wheel 25 meshing with the planet wheel 20a.

This rotation, as permitted by the window 13 for an angle a, causes the nut screw 4 to lower again as far as to lock the teeth of the ring gear 7 with those of the fixed gear 8, thereby resetting or recovering the locking position, as it is shown in FIG. 4a, with the tool in its new working position (FIG. 4d), ready for a new working cycle.

The reversing of the revolving movement of the tool carrying body 6, as obtained by acting on the electric motor through suitable contacts, is carried out as the hollow 11 of the body 6 as slightly passes the clutching position of the bolt 9, in order to be sure that said hollow really faces the bolt 9 with a very reduced speed and with the inclined portion in the movement direction, in order to permit a true introduction of the end 9a of said bolt 9 into the hollow or slot 11.

This introduction or inserting causes the opposite end 9b of the bolt 9 to exit the window 13a, or slot, of the nut screw, 4 with a consequent disengaging of said nut screw, which can start to rotate thereby starting, in turn, the clutching movement of the movable ring gear rigid with the tool carrying body 6 with the fixed ring gear rigid with the turret base.

If, however, said tool carrying body 6 is not stopped and moves back, upon having passed a hollow 11, continuing its anticlockwise rotation to reach a next working position by jumping one or more intermediate working positions, then the bolt 9 is pushed, even in this case, to enter a facing hollow 11. However this movement of said bolt 9 can not be carried out in a complete way since, as thereinabove stated the tool carrying body 6 continues to rotate, jointly to the respective hollow 11, thereby even if the bolt 9, as pushed by the spring 10 tends to enter the hollow, the insertion is possibly only when the rectilinear sides of the two portions are aligned: however during this insertion the hollow continues to shift frontwardly, in such a way as to present its inclined side against the corresponding inclined side of the bolt, thereby preventing the end of said bolt from reaching the hollow bottom.

Accordingly the penetration is only partial, thereby the opposite end 9b of the bolt 9 is held, partially, within the window 13a of the nut screw 4, thereby holding locked said nut screw 4 with the fixed upright 2.

It should be noted that, in this embodiment of the invention, it is possible to cause the tool carrying body 6 to reach any working position, though not consecutive, being however impossible an accidental unlocking of the nut screw unless the tool carrying body 6 has reached a working position.

Figure 5:
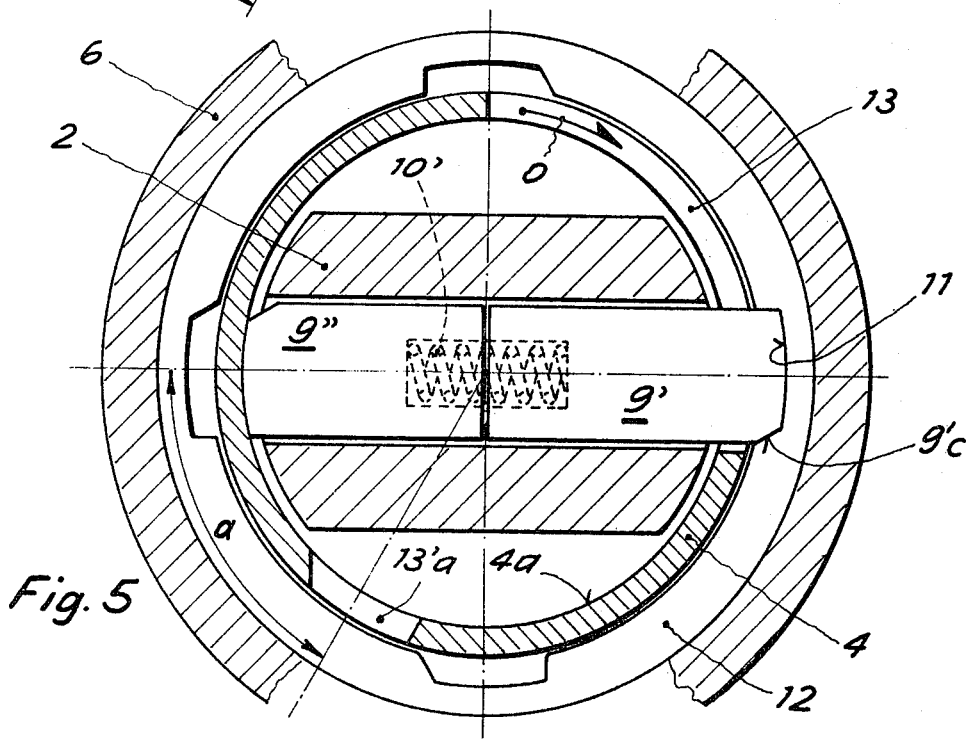
FIG. 5 is a cross-section view analogous to FIG. 2, showing a two-bolt variation of the invention.

As a variation, the invention provides for an embodiment with two locking bolts, as it is shown in FIG. 5, where, instead of the bolt 9, two locking bolts 9' and 9" are provided, being free of axially moving in the guides formed in the central upright 2 and pressed against the walls of the nut screw 4 and of the locating ring 12, rigid with the tool carrying body, 6, by a spring 10'; the radial window 13'a, formed in the neck of the nut screw 4, is also in this case provided with an inclined side, slanted with respect to the axis of said window and having a rectilinear opposite side.

Since also the locking bolt provided for engaging with said radial window 13'a formed in the neck of said nut screw in constantly pressed against said neck by the spring 10', said bolt 9' will enter said hollow 11 as soon as this latter will face the bolt, while the opposite side 9", normally resting against the cylinder 4a in such a way as to lock the bolt 9' in the hollow 11, is able of entering, at the end of the rotation a of the nut screw, the window 13'a, thereby allowing for the opposite end to exit the hollow 11 for the rotation of the tool carrying body 6. The total length of the two bolts should be equal to the length of a single bolt or it should correspond to the maximum permissible length between the surface 4a and the hollow 11.

As the movement is reversed, the bolt 9" is pushed at the center by the inclined plane of the window 13'a, or slot, and, in turn, the bolt 9", by abutting against the locating bolt 9', after this latter is entered the hollow 11 due to the spring 10', prevents said locating bolt 9' from exiting the hollow, since it rests with its free end on the surface 4a. The radial side of the locking bolt 9", upon having entered the window 13a of the nut screw, provides a stop for the movement of said nut screw.

Accordingly, in this variation of the invention it is not necessary to provide for the stop of the rotation of the nut screw at the starting of the cycle, said stopping being provided by the bolt 9" itself, as it enters the window 13'a, after the rotation angle a.

The invention so conceived is susceptible to several modifications and variations, all of which fall within the scope of the inventive idea.

I claim:

1. A revolving tool carrying turret for lathes and the like machine tools, comprising a fixed base and a movable tool carrying body, effective to be locked to one another by base ring gears and the like, characterized in that said fixed base is provided with a central upright or column, thereon is coaxially formed a screw rigid with said upright, engaging a nut screw effective to revolve and axially move only through a predetermined angle, or axial shifting, corresponding to the movement required for unlocking or locking said base ring gears, said nut screw being axially associated with said tool carrying body, said nut screw and said tool carrying body being able of revolving with respect to one another, said central upright supporting, at the top end thereof, an electric motor therewith is coupled en epicyclical unit having a first end gear wheel rigid with said tool carrying body and a second end gear wheel rigid with said nut screw, between said two end gear wheels one or more planet wheels being located, said planet wheels pertaining to said epicyclical unit, between said fixed upright and said movable tool carrying body locating and locking means being provided formed by a sliding bolt effective to transversely slide within said fixed upright and perpendicularly to the axis thereof, and by locating hollows or slots as formed in said tool carrying body, or rigid therewith, said bolt being biassed by a spring to penetrate for locating one end of said tool carrying body within one said hollow or slot, the other end of said tool carrying body being prevented from moving by an abutment surface rigid with said nut screw, said bolt being effective to exit said one locating hollow or slot by rotating said tool carrying body through the contact of inclined planes of the two portions simultaneously to the aligning with said other end of said bolt of a radial hollow of like size as formed in said abutment surface of said nut screw in order to permit said tool carrying body to move from a position to a next one, said revolving or rotating movements of said nut screw and said tool carrying body being carried out by said planet wheels of said epicyclical unit, when either one or the other of said end wheels locates at a stop position.

2. A turret according to claim 1, characterized in that said locking bolt is rotatively fixed and transversely movable with respect to said fixed central upright, by traversing said revolving unit nut screw coaxial with said fixed upright in a radial window or slot having an angular extension equal to or greater than the rotation required for axially moving said locking ring gears and disengaging said tool carrying body from the base locking.

3. A turret according to claim 1, characterized in that said bolt and said locating hollow or slot have the sides thereof facing to the revolving direction of said tool carrying body, radially or parallely to the radius, and the opposite sides thereof formed as rearwardly inclined planes, thereby the revolving or rotating movement of said tool carrying body in the normal direction drives said bolt for exiting said hollow or slot, the revolving or rotating movement in the opposite direction being prevented from occurring.

4. A turret according to the preceding claims, characterized in that said bolt is biassed by a resilient means to enter, with its free end, said locating hollow or slot of said tool carrying body facing thereto during the revolving of said body, said bolt being prevented from exiting said locating hollow or slot by an opposite wall of said nut screw effective to maintain in a contact relationship with said bolt and being displaced or moved away as said nut screw angularly revolves in such a way as to disengage or unlock said tool carrying body from said base.

5. A turret according to claim 1, characterized in that said locating bolt can be formed in two portions, aligned or slanted with respect to one another, each said portion being biassed outwardly by an elastic means, being preferably interposed between said portions, the total length of said portion corresponding to the length of the single bolt or to the maximum length for a locked positioning, the lock providing bolt portion opposite to the bolt locating or positioning portion having the end thereof provided with a slanted side symmetrical with respect to that of the locating end and the related nut screw hollow or slot being formed with a like slanted or inclined plane, thereby said bolt is caused to exit said hollow or slot as the revolving movement of said nut screw is reversed, to cooperate to the locking of said tool carrying body in its position.

6. A turret according to claim 1, characterized in that said locating hollows or slots are separately formed on a ring member effective to be made rigid with said tool carrying body.

* * * * *